Jan. 13, 1931.
L. V. WILSON
1,788,901
CHURN
Filed March 15, 1929
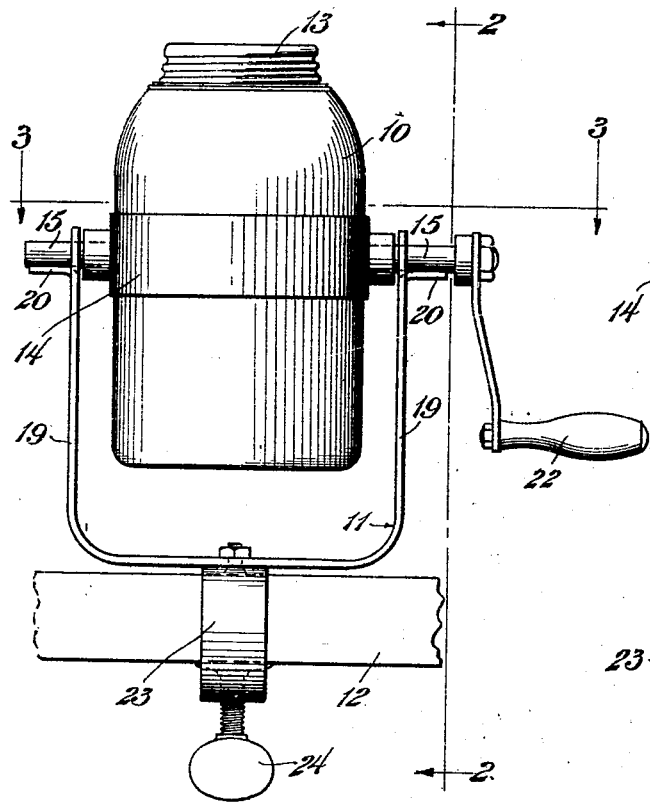
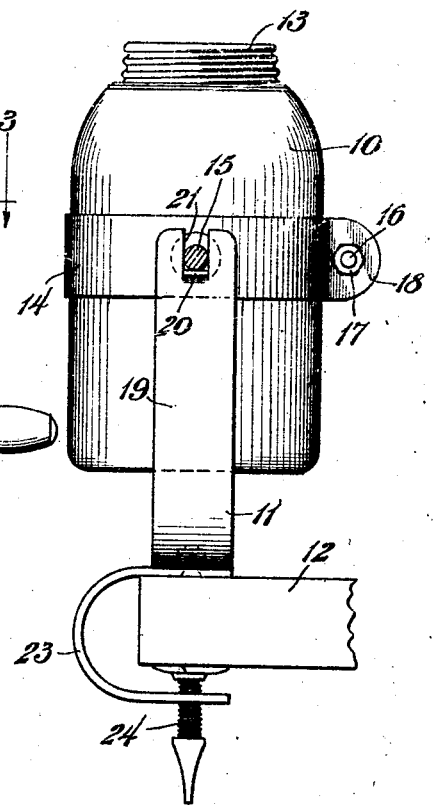
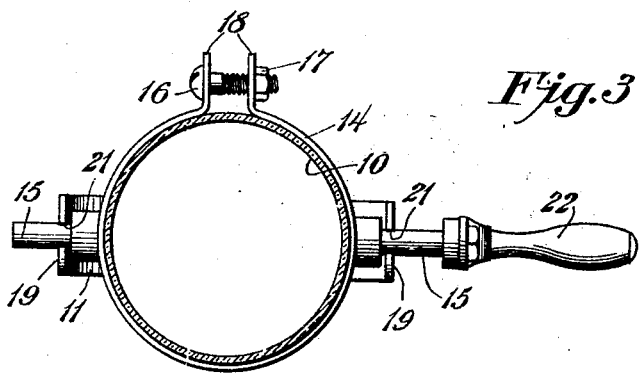
INVENTOR
L. V. Wilson
BY
ATTORNEYS Patented Jan. 13, 1931

1,788,901

UNITED STATES PATENT OFFICE

LOYAL V. WILSON, OF SUMMIT, OREGON

CHURN

Application filed March 15, 1929. Serial No. 347,419.

This invention relates to churns and aims, among other objects, to provide an improved and simple churn frame which can be easily constructed and which is particularly adapted to be used with standard fruit jars or the like.

In the drawings,

Fig. 1 is a side elevation of one embodiment of the invention;

Fig. 2 is a vertical section taken on the line 2—2 of Fig. 1; and

Fig. 3 is a horizontal section taken on the line 3—3 of Fig. 1.

Referring particularly to the drawings, and to the preferred embodiment of the invention there shown, an ordinary fruit jar or receptacle 10 is shown as being rotatably mounted in the improved metal frame 11, which is adapted to be removably secured to a suitable support 12 such as a table or the like.

Herein, the glass fruit jar 10 has a screw-threaded top or cover 13. However, a jar having any ordinary clamped cover may be employed. The jar is preferably supported for rotation in the frame by means of a clamp member 14 secured to the body of the jar and having opposed trunnions 15 riveted, or otherwise rigidly secured thereto, and journaled in the frame. The clamp member 14 is shown as comprising a metal strap passing transversely around the jar and removably secured thereto by means of a bolt 16 and a nut 17, the bolt passing through spaced outstanding ears 18 formed at the ends of the strap.

The frame 11 may be made of strap metal or sheet metal strips bent into substantially U-shape, as shown, to provide vertical standards 19. The upper ends of the standards are provided with bearings for the trunnions, the bearings being preferably formed by cutting a central tongue 20 at the top of each standard. The tongue, which is as wide as the diameter of the trunnion, is then bent outwardly at right angles to the standards. The sides of the open-ended vertical slot 21 thus formed engage the sides of the trunnion, while the tongue 20 provides a relatively large bearing surface to support the trunnions. The churn may be manually rotated by means of a crank handle 22 secured to the outer end of one of the trunnions.

In order that the frame 11 may be removably secured to a support, a C shaped clip 23 is rigidly secured to the bottom of the frame and is provided with a clamping bolt 24 screw-threaded through its lower arm and adapted to engage the underside of the support.

In the operation of the churn, the cream is placed in a fruit jar of the right size and the clamp member 14 is secured to the jar intermediate its ends. The frame 11 is secured to a support and the trunnions 15 are placed in the bearings. It is then only necessary to turn the crank a short time to bring the butter. By using standard glass fruit jars, the churn may be easily cleaned and thus kept in a sanitary condition. Moreover, the jar being glass, the butter may be instantly seen when it comes. Also, should the jar become cracked or broken, it can be replaced by another at a cost of only a few cents. Hence, the cost of maintenance is practically negligible. The churns may be made in different sizes to accommodate fruit jars of various capacities.

Obviously, the present invention is not restricted to the particular embodiment thereof herein shown and described.

What I claim is:—

A churn comprising, in combination, a U-shaped metal frame providing spaced supports; said supports having open-ended vertical slots in their upper ends; a tongue bent outwardly from each support at the bottom of the slots; a circular sheet metal clamping member; a glass fruit jar secured in the clamping member; opposed trunnions rigidly secured to the clamping member; said trunnions being mounted in said slots and supported on said tongues; and a crank handle secured to one of the trunnions.

In testimony that I claim the foregoing as my own, I have hereto affixed my signature.

LOYAL V. WILSON.